United States Patent
Streckfus

(10) Patent No.: US 10,201,245 B2
(45) Date of Patent: Feb. 12, 2019

(54) AUTOMATIC BROILER WITH AIR FLOW RESTRICTION PLATE

(71) Applicant: BURGER KING CORPORATION, Miami, FL (US)

(72) Inventor: Stefan Streckfus, Miami, FL (US)

(73) Assignee: BURGER KING CORPORATION, Miami, FL (US)

( * ) Notice: Subject to any disclaimer, the term of this patent is extended or adjusted under 35 U.S.C. 154(b) by 352 days.

(21) Appl. No.: 14/754,379

(22) Filed: Jun. 29, 2015

(65) Prior Publication Data
US 2016/0374508 A1    Dec. 29, 2016

(51) Int. Cl.
*A47J 37/12*  (2006.01)
*A47J 37/06*  (2006.01)
*F24C 15/00*  (2006.01)

(52) U.S. Cl.
CPC ......... *A47J 37/0611* (2013.01); *F24C 15/001* (2013.01)

(58) Field of Classification Search
CPC .... A47J 37/044; A47J 37/045; A47J 37/0611; F24C 14/00; F24C 15/001; F24C 15/002; F24C 15/20; F24C 15/2007; F24C 15/2014
See application file for complete search history.

(56) References Cited

U.S. PATENT DOCUMENTS

| | | | |
|---|---|---|---|
| 1,169,594 A * | 1/1916 | Swisher | B23B 27/04 407/106 |
| 6,723,970 B1 * | 4/2004 | Whipple, Jr. | F24C 15/2007 126/21 A |
| 8,847,119 B2 * | 9/2014 | Hildner | F24C 15/2014 126/19 R |
| 2007/0248924 A1 * | 10/2007 | Ljungmann | G01N 1/31 432/5 |
| 2008/0141868 A1 * | 6/2008 | Cook | A47J 37/045 99/386 |
| 2011/0226230 A1 * | 9/2011 | Reese | F24C 15/20 126/21 A |

* cited by examiner

*Primary Examiner* — Dana Ross
*Assistant Examiner* — Brandon Harvey
(74) *Attorney, Agent, or Firm* — Arent Fox LLP

(57) ABSTRACT

In an aspect, the disclosure provides an automatic broiler. The automatic broiler may include a conveyorized cooking surface, a lower heat source below the cooking surface, and an upper heat source above the cooking surface. A cooking chamber may be defined by the cooking surface, the upper heat source, and a broiler housing. A venting through passage, or flue, may extend from the cooking chamber to an opening located above the upper heat source. An air flow restriction plate may be positioned above the venting through passage. The air flow restriction plate may have a perforated flat surface extending across the opening.

16 Claims, 6 Drawing Sheets

AUTOMATIC BROILER WITH AIR FLOW RESTRICTION PLATE

FIELD

Aspects of the present disclosure relate to automatic broilers for batch cooking. The disclosed broilers have particular use in quick serve and fast food service restaurants. In particular, for example, aspects of the disclosure relate to an automatic broiler including an air flow restriction plate.

BACKGROUND

Conveyorized chain cooking of various foodstuffs is known in the fast-food industry. Typically, conveyorized chain cooking devices comprise a continuously moving conveyorized cooking surface positioned adjacent to heating elements. Such conveyorized chain cooking devices allow for the continuous sequential cooking of food products such as beef patties and thus accommodate high demand periods in fast food restaurants. Conveyorized cooking devices also increase the efficiency of kitchen operations by uniformly cooking similar food products without continuous attention from the cook.

As the skilled artisan will readily appreciate, there is a difference between broiling and baking. Broiling typically requires cooking temperatures of approximately 500° F. or more. Additionally, broiling involves an initial searing action to lock in juices and flavor. As a result, the cooked product is juicier and more flavorful in addition to having an appealing browned outer texture. Baking, on the other hand, typically requires cooking temperatures of approximately 450° F. or less. Baking involves cooking without an initial searing action and can lead to a dry and tasteless product with an unappealing texture and color.

In some cases, a broiler may have an uneven cooking pattern. A primary air intake may be located beneath a lower burner and provide oxygen for both the lower burner and an upper burner. Generally, the broiler maintains a low air pressure to vent cooking fumes out of the broiler through a flue. In some broilers, food insertion and discharge openings are located at the same level as the cooking surface. Unheated air may enter through the food insertion and discharge openings and cause cool spots within the broiler. Food products within the same batch may not be uniformly cooked based on the position within the broiler. Also, individual food products may not have a uniform temperature throughout when finished cooking.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect, the disclosure provides an automatic broiler. The automatic broiler may include a conveyorized cooking surface, a lower heat source below the cooking surface, and an upper heat source above the cooking surface. A cooking chamber may be defined by the cooking surface, the upper heat source, and a broiler housing. A venting through passage, or flue, may extend from the cooking chamber to an opening located above the upper heat source. An air flow restriction plate may be positioned above the venting through passage. The air flow restriction plate may have a flat surface extending across the opening.

In an aspect, the air flow restriction plate may include a plurality of openings or through holes. The through holes may create an open area totaling approximately 30% to 50% of an area of the flat surface, preferably 40% of the area of the flat surface. In an aspect, the through holes may be approximately ⅛ inch in diameter.

In another aspect, the air flow restriction plate includes handles along opposite sides. For example, the air flow restriction plate may be rectangular and the handles may be formed along a pair of long sides. The handles may extend an entire length of each of the long sides. The handles may be integrally formed with the air flow restriction plate, each handle including: a vertical portion extending from the flat surface of the air flow restriction plate and a horizontal portion extending inward from the vertical portion.

In another aspect, the automatic broiler may further include a catalytic exhaust element, impedance pan, or heat spreader located above the air flow restriction plate. The catalytic exhaust element, impedance pan, or heat spreader may be placed on the handles of the air flow restriction plate.

In an aspect, the automatic broiler may include a controller configured to control a fuel supply to at least the upper heat source according to a plurality of cooking programs for a food product and to move the cooking surface upon completion of a cooking time. The controller may use a first cooking program for the food product when the air flow restriction plate is positioned above the top end of the venting through passage, and the controller may use a second cooking program for the food product when the air flow restriction plate is not positioned above the top end of the venting through passage. The first cooking program may have a first cooking time for the food product that is shorter than a second cooking time of the second cooking program for the food product.

In another aspect, the disclosure provides an air flow restriction plate for a broiler having a flue. The air flow restriction plate may include a rectangular perforated sheet sized to extend across a top opening of the flue. The perforated sheet may include a flat surface having a plurality of openings or through holes. The through holes may constitute approximately 40% of a surface area of the sheet. The air flow restriction plate may further include handles formed along opposite sides of the sheet. In an aspect, the perforated sheet may be steel.

Additional advantages and novel features of these aspects will be set forth in part in the description that follows, and in part will become more apparent to those skilled in the art upon examination of the following or upon learning by practice thereof.

BRIEF DESCRIPTION OF THE DRAWINGS

The disclosed aspects will hereinafter be described in conjunction with the appended drawings, provided to illustrate example features and not to limit the disclosed aspects, wherein like designations denote like elements, and in which.

DETAILED DESCRIPTION

Various aspects are now described with reference to the drawings. In the following description, for purposes of explanation, numerous specific example details are set forth in order to provide a thorough understanding of one or more aspects. It may be evident, however, that such aspects may be practiced without these specific details.

The present disclosure provides for an automatic broiler including an air flow restriction plate. The air flow restriction plate may be placed above an exhaust flue of the automatic broiler in the path of hot gases, fumes, and smoke produced by broiling food products. The air flow restriction plate may increase the air pressure and/or temperature within a cooking chamber of the automatic broiler. The higher air pressure may prevent uneven cooking that may occur due to drafts within the cooking chamber. The higher air pressure and temperature may also reduce the required cooking time for various food products.

The air flow restriction plate may be a generally flat plate including a plurality of holes. The air flow restriction plate may be shaped to match an upper opening of a venting through passage or flue. For example, the air flow restriction plate may be rectangular with at least one dimension larger than an upper opening of the flue such that the air flow restriction plate may rest on top of the opening. The plurality of holes or openings may create open areas within the air flow restriction plate equaling approximately, for example, 40% of the total area of the air flow restriction plate. The air flow restriction plate may further include handles. The handles may be integrally formed along opposite sides of the air flow restriction plate. For example, the opposite edges may be bent upwards and inwards at right angles to form the handles. Thus, the air flow restriction plate may be formed from a single sheet, and the handles may be formed by bending the sheet to form the handles. The handles may allow easy removal of the air flow restriction plate for inspection and cleaning.

Figure 1:
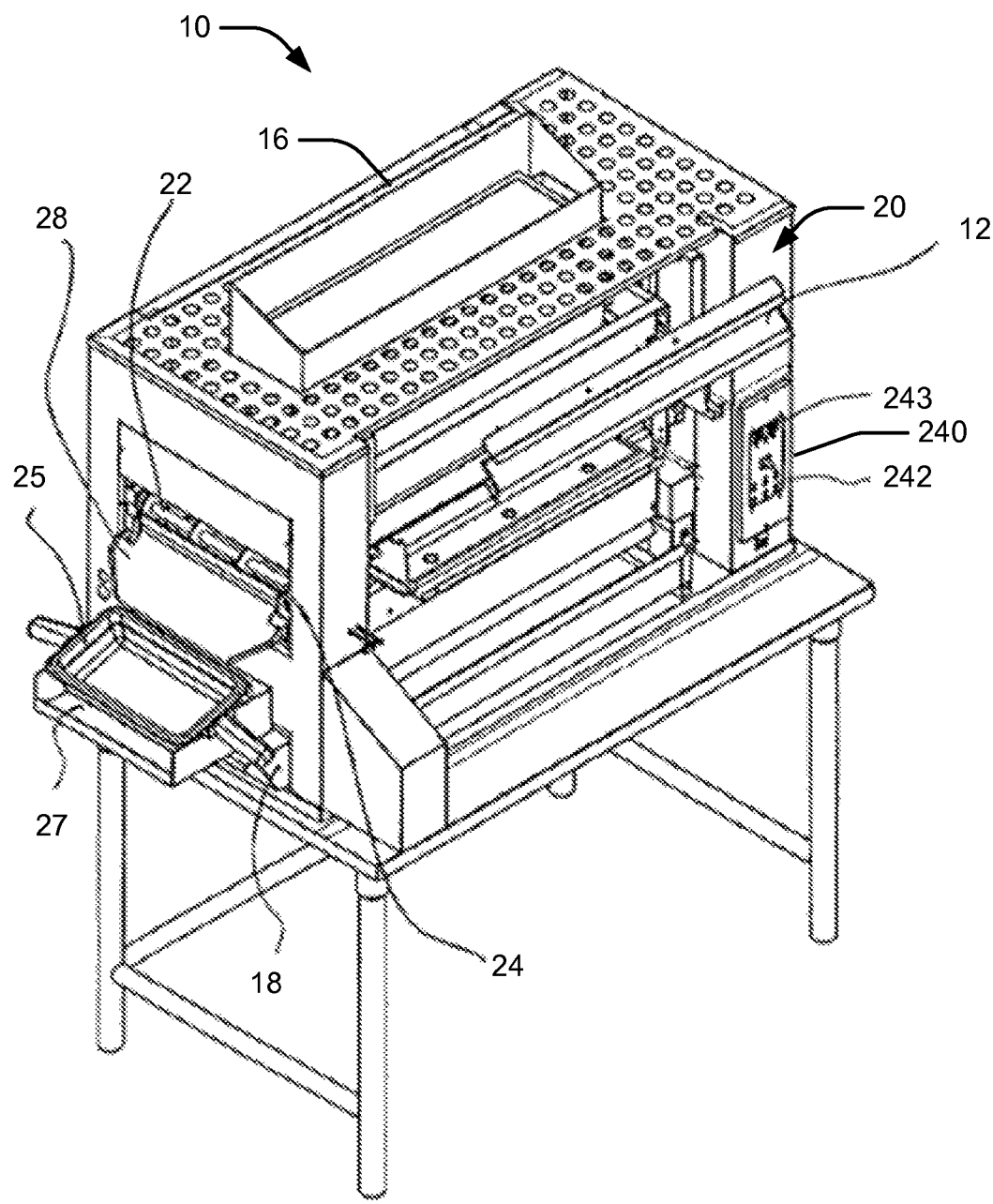
FIG. 1 illustrates an automatic broiler in accordance with aspects of the present disclosure.

As seen in FIG. 1, an automatic broiler 10 may generally include a door/loader assembly 12, impedance pan 16, discharge opening 24, food holding pan 25, discharge slide 28, and a controller 240 including a control display 243 and control interface 242. A housing 20 may support a conveyor 22 that may provide a cooking surface. The conveyor 22 may also be referred to as a conveyorized cooking surface. A discharge slide 28 may be located adjacent a discharge opening 24 and below an upper surface of the conveyor 22 to receive food products discharged from the conveyor 22 and may direct such food products to holding pans 25. The housing may include a top opening for venting exhaust gases. An impedance pan 16 may fit into the top opening to impede flames (e.g., from grease flare ups) from exiting the broiler 10.

In an aspect, conveyor 22 is suitable for broiling various food products and more preferably may be suitable for flame broiling various food products. Conveyor 22 may be sized to receive multiple rows of similar food products to facilitate batch cooking of those food products. In an aspect, conveyor 22 may remain stationary during cooking and may only advance the food product once the cooking or broiling process is completed. Alternatively, the conveyor 22 may move the food product continuously, or at specific times during the cooking process. Upon discharge of the food product from the conveyor 22, the conveyor 22 may stop movement until the completion of the cooking process for the next batch of food products. The controller 240 may control the movement of the conveyor 22 as well as the internal broiler temperature and cooking times.

Further details of an example automatic broiler without an air flow restriction plate may be found in U.S. Pat. No. 8,033,213, which is assigned to the assignee hereof, and hereby incorporated by reference in its entirety for all purposes.

Figure 2:
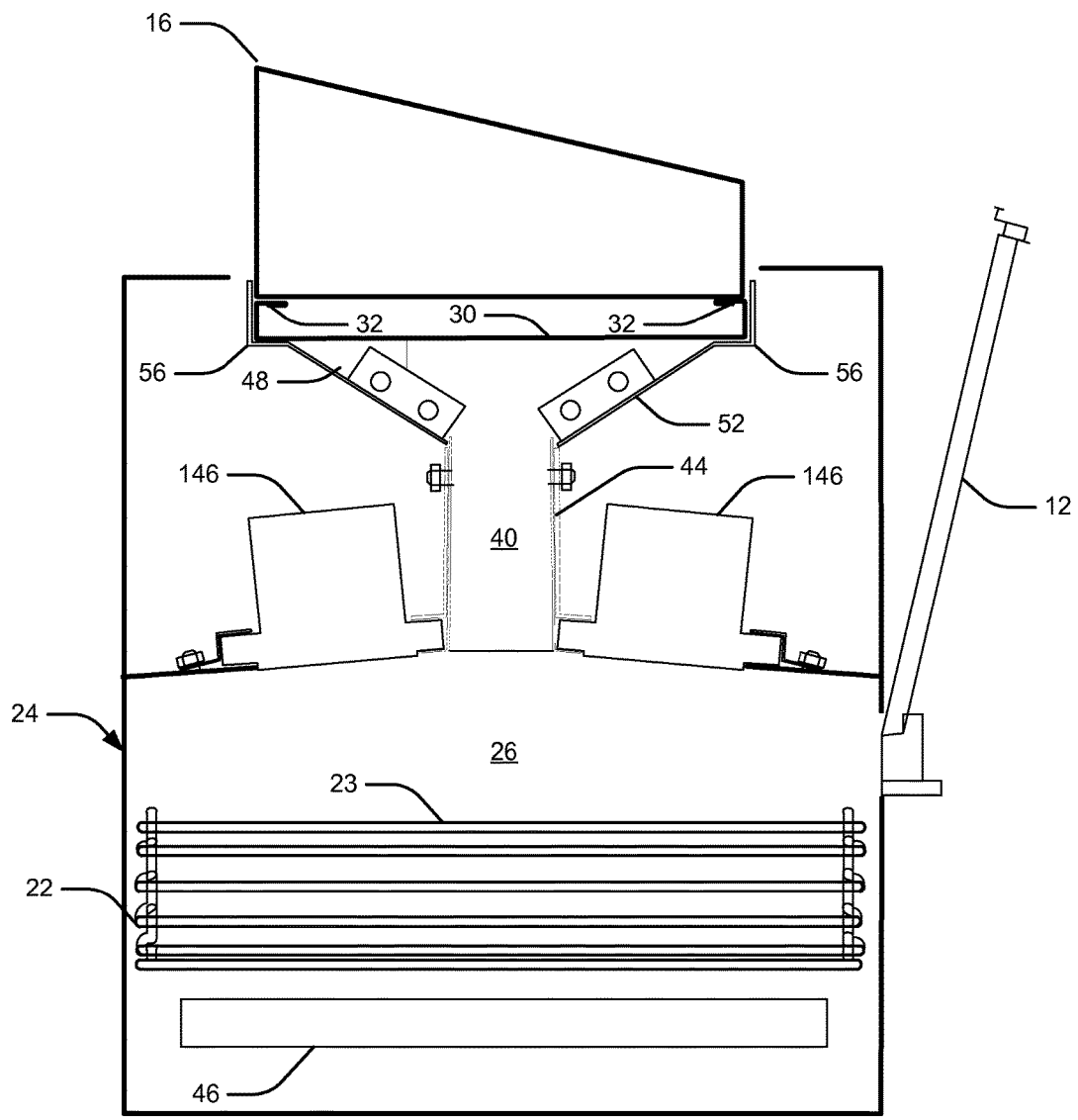
FIG. 2 illustrates a cross section of an automatic broiler including an air flow restriction plate in accordance with aspects of the present invention.

Referring now to FIG. 2, the housing 20 may contain a cooking chamber 26, a conveyor 22 defining a cooking surface 23 for moving food products (e.g., hamburgers) through the cooking chamber, and a burner system for cooking food products on the cooking surface 23 of the conveyor 22. The burner system may be a gas fueled system which emits infrared energy and flames to cook the food. The burner system may include a lower heat source 46 positioned below the conveyor 22 and an upper heat source 146 positioned above the conveyor 22. The burner system may also be an electric system or a combination gas/electric system. The cooking chamber 26 may be defined on the bottom by the cooking surface 23, at the top by the upper heat sources 146, and on the sides by the broiler housing 20. The housing 20 may further contain a tray 18, or other means for catching and removing grease or other byproducts from the housing 20.

In an aspect, the burner system may be controlled by the controller 240. The controller 240 may include a display 243 and interface 242 allowing an operator to select a cooking program or recipe for cooking a food product. The controller 240 may control the upper heat source 146 and/or the lower heat source 46 according to a selected program by, for example, regulating a flow of fuel, setting a temperature, or activating/deactivating one or more of the heat sources. The controller 240 may also move the conveyor 22 according to the selected program when the cooking process for a food product is complete. Accordingly, the broiler 10 may selectively cook different food products. In an aspect, the controller 240 may include at least two cooking programs or recipes for a single food product. A first recipe may be used when the broiler 10 has an air flow restriction plate installed. A second recipe may be used when the broiler 10 does not have an air flow restriction plate installed. The first recipe may use a shorter cooking time than the second recipe for the same food product.

Hot gas and by-products of the cooking process (e.g., grease, smoke, and other particles) may escape the cooking chamber 26 through a flue 40 on the housing. As such, the flue 40 may be considered a venting through passage. Flames generated during the cooking process, as during grease flare-ups, may also be emitted up through the flue 40. The flue 40 may include a rectangular lower flue stack 44 communicating at its lower end with the cooking chamber 26, and a rectangular upper flue stack 48 having a floor 52, which may slope up from the lower flue stack to a pair of rectangular shoulders 56 at the upper end of the flue assembly. In an aspect, the area between the shoulders 56 may be considered to be the opening of the flue 40. In another aspect, the opening may be above the shoulders 56. The lower flue stack 44 may be relatively narrow and may pass between the upper heat sources 146. The upper flue stack 48 may have a length approximately the same as the length of the lower flue stack 44, and a width at the shoulder substantially more than the width of the lower flue stack 44. The shape of the flue 40 and its component parts may be other than rectangular (e.g., circular). The height of the flue 40 may also vary.

The air flow restriction plate 30 may be placed on the rectangular shoulder 56 to rest above the flue 40. The air flow restriction plate 30 may extend across the opening of the flue between the shoulders 56. The handles 32 may extend upward and inward from the air flow restriction plate 30 along opposite sides. The handles 32 may also form rectangular shoulders such that another exhaust component such as the impedance pan 16, heat spreader (not shown), or catalyst (not shown) may be placed on top of the air flow restriction plate instead of on the rectangular shoulders 56. A catalyst may be formed of a reactive material and clean exhaust gases exiting the flue 40. A heat spreader may be placed below the catalyst to distribute heat evenly across the catalyst. The air flow restriction plate 30 may be used with or without an impedance pan, heat spreader, or catalyst. The broiler 10 may be placed under an exhaust hood that provides vacuum to remove the exhaust gases from a kitchen.

The air flow restriction plate 30 may be perforated such that it allows some air to exit the flue 40. The air flow restriction plate 30, however, may restrict or prevent some air from easily exiting the flue 40. The air flow restriction plate 30 may, therefore, increase air pressure within the flue 40 and the cooking chamber 26. The increased air pressure in the cooking chamber may help reduce drafts caused, for example, by unheated air entering the cooking chamber via the door/loader assembly 12 and the discharge opening 24. Instead, air may enter primarily through a primary air intake located below the lower heat source 46, where the air pressure may be lower. Accordingly, the lower heat source 46 may heat the air before it reaches the food product on the cooking surface 23. Thus, the air flow restriction plate may help to maintain a more even, consistent temperature within the cooking chamber. This provides a more reliable food product.

Figure 3A:
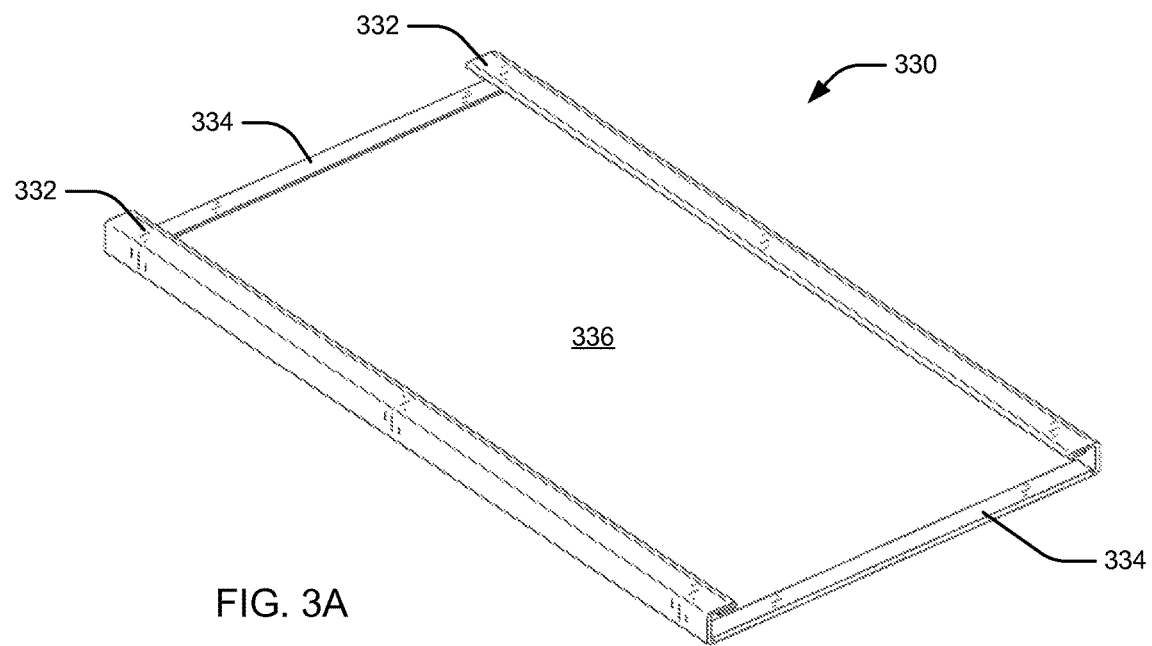
FIG. 3A illustrates a perspective view of an air flow restriction plate in accordance with aspects of the present disclosure.
Figure 4:
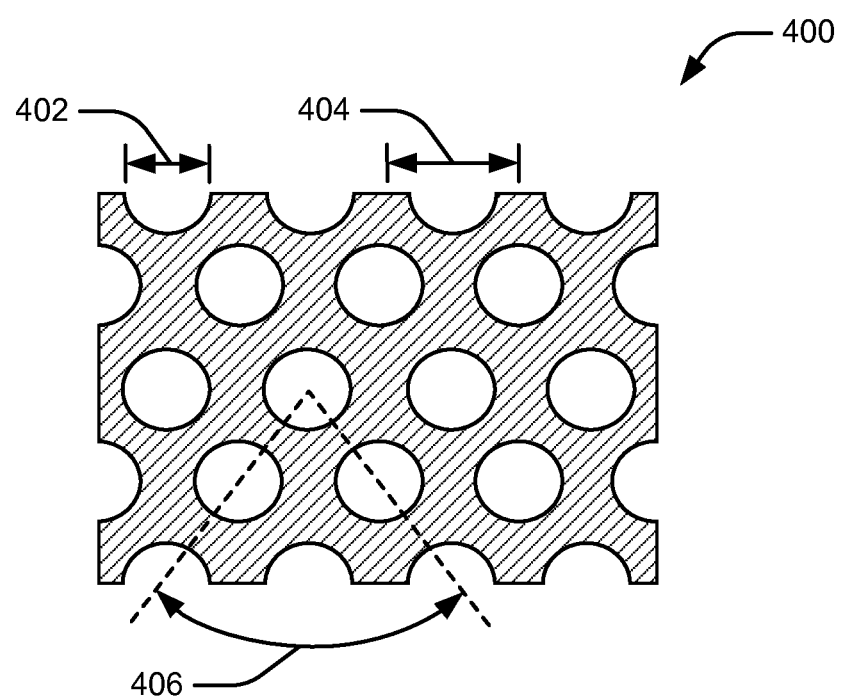
FIG. 4 illustrates an example of a pattern of holes in an air flow restriction plate in accordance with aspects of the present disclosure.

FIG. 3A illustrates a perspective view of an example air flow restriction plate 330. The air flow restriction plate 330 may correspond to the air flow restriction plate 30 (FIG. 2). The air flow restriction plate may be configured to restrict a flow of air out of the cooking chamber and to maintain a more consistent cooking temperature. For example, the air flow restriction plate may be configured to increase air pressure in the cooking chamber by restricting air flow out of the flue. The air flow restriction plate 330 may be generally rectangular. In an aspect, the air flow restriction plate may be sized to match an upper opening of a flue 40 (FIG. 2). In one embodiment, for example, the air flow restriction plate 330 may be approximately 27 inches long by 9.25 inches wide. The air flow restriction plate 330 may include a flat surface 336. The flat surface 336 may be perforated by a plurality of openings or holes. The plurality of openings may be spaced over the flat surface 336 in various patterns, e.g., pattern 400 (FIG. 4). The air flow restriction plate 330 may include integrally formed handles 332. As illustrated in FIG. 3A the handles 332 may be extend vertically from opposite long edges of the flat surface 336 to form vertical handle portions 338. The handles 332 may also extend inwardly from the vertical portions to form horizontal handle portions 340. The flat surface 336 may also be hemmed along opposing short sides to form hemmed portions 334. The hemmed portions 334 may provide additional strength to prevent bending or twisting of the air flow restriction plate 330.

Figure 3B:
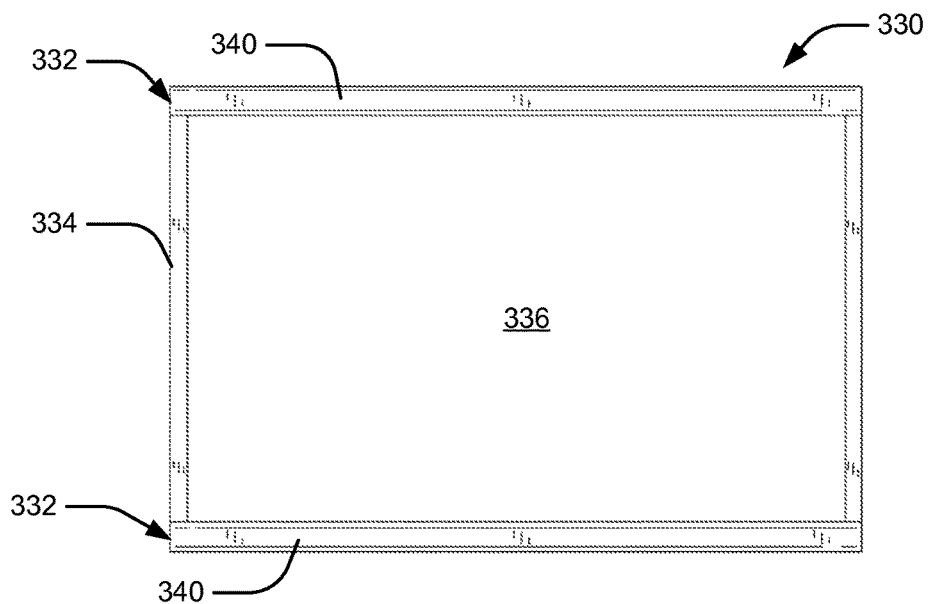
FIG. 3B illustrates a top view of an air flow restriction plate in accordance with aspects of the present disclosure.

FIG. 3B illustrates a top plan view of the air flow restriction plate 330 showing the handles 332, hemmed portion 334, and flat surface 336.

Figure 3C:
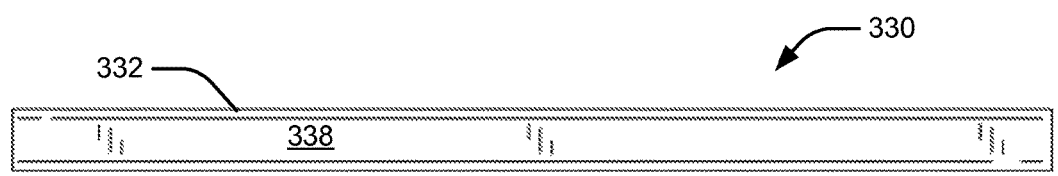
FIG. 3C illustrates a side view of an air flow restriction plate in accordance with aspects of the present disclosure.

FIG. 3C illustrates a side view of the air flow restriction plate 330 showing the handles 332 including vertical handle portions 338.

Figure 3D:
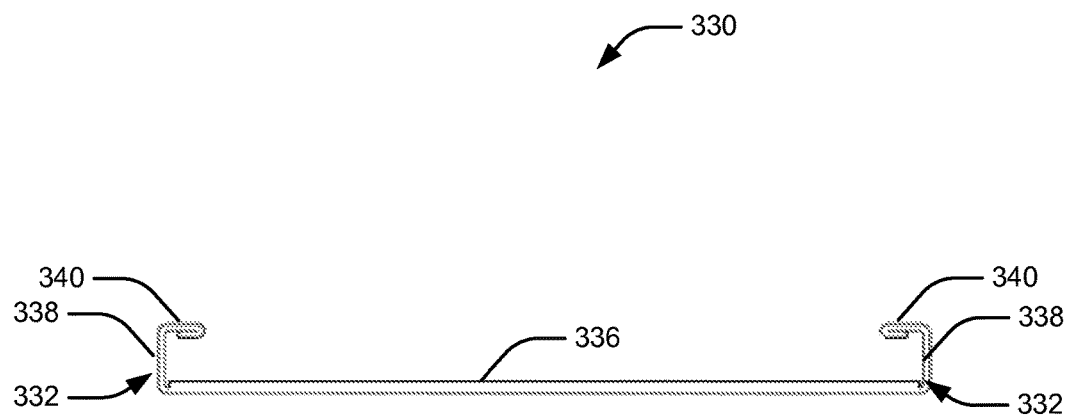
FIG. 3D illustrates an end view of an air flow restriction plate in accordance with aspects of the present disclosure.

FIG. 3D illustrates a cross sectional view of the air flow restriction plate 330 along the line A-A of FIG. 3B. In FIG. 3D, the flat surface 336, vertical handle portions 338, and horizontal handle portions 340 are shown.

Figure 3E:
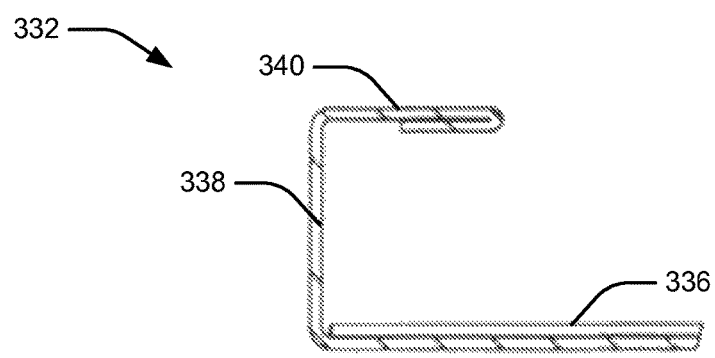
FIG. 3E illustrates a detailed view of a corner of an air flow restriction plate in accordance with aspects of the present disclosure.

FIG. 3E illustrates a detailed cross sectional view of a handle 332 of the air flow restriction plate 330. As shown, the horizontal handle portion 340 may be hemmed Hemming the horizontal handle portion 340 may strengthen the handle 332 for lifting the air flow restriction plate 330 by the handles 332. Hemming may also reduce the likelihood of a sharp edges or burrs forming on the handles 332.

In an aspect, the air flow restriction plate 330 may be constructed of, for example, 22 gauge steel. Other gauges may be used based on the broiler design and size of the flue opening. The handles 332 may be formed by bending a single flat sheet of steel at right angles. Further, the air flow restriction plate 330 may be constructed of other food-safe materials that may withstand high temperatures.

FIG. 4 illustrates an example pattern 400 for a plurality of openings or holes in an air flow restriction plate. For example, the pattern 400 may be used for the flat surface of the air flow restriction plate 30 or the flat surface 336 of the air flow restriction plate 330. The pattern 400 may include openings that are generally evenly spaced across the flat surface. For example, as illustrated in FIG. 4, the pattern 400 may include staggered circular openings. In an aspect, the openings may have a diameter 402, a distance between openings 404, and an angle 406 between openings. In one embodiment, the diameter 402 may be approximately 0.125 inches, the distance between the openings 404 may be approximately 0.1875 inches, and the angle 406 may be approximately 60°. Such a pattern of openings may result in the flat surface 336 having an open area of approximately 40%. Moreover, the pattern 400 may prevent weak spots that may be subject to warping when exposed to high heat. Further, the pattern 400 may cover the entire flat surface 336 such that exhaust gases may escape the flue 40 uniformly to help create an even pressure differential.

Although the openings illustrated in FIG. 4 are circular, other shapes of openings may be used in different examples. The openings might have linear sides, such as rectangular or triangular openings, among others. The perforations may have different sizes or a different spacing from each other depending on a position on the surface of the plate. The air flow restriction plate may comprise any manner of perforations that assist in maintaining an even and consistent temperature in the cooking chamber. In different implementations, the air flow restriction plate may comprise a mesh material, which restricts passage of a portion of air.

When tested, an air flow restriction plate having an open area of approximately 40% resulted in a marked improvement in the variation among food products (e.g. hamburgers) prepared with a broiler 10. For example, when finished food products were tested using a 4 point instantaneous thermometer, an air flow restriction plate having an open area of approximately 40% resulted in a 62% average reduction in temperature variation among the four 4 points, as compared to the same broiler without an air flow restriction plate. Moreover, consistency among different food products in the same batch was increased resulting in fewer undercooked food products and fewer overcooked food products. The cooking time for a recipe may also be reduced when the air flow restriction plate 330 is used. Air flow restriction plates having a higher percentage of open area (e.g., 60%) did not produce significant improvement in variation. In an aspect, an air flow restriction plate having open area of no more than 50% may produce improvements in temperature variation of cooked food products.

While the foregoing disclosure discusses example aspects and/or features, it should be noted that various changes and modifications could be made herein without departing from the scope of the described aspects and/or features as defined by the appended claims. Furthermore, although elements of the described aspects and/or features may be described or claimed in the singular, the plural is contemplated unless limitation to the singular is explicitly stated. Additionally, all or a portion of any aspect and/or embodiment may be utilized with all or a portion of any other aspect and/or feature, unless stated otherwise.

What is claimed is:

1. An automatic broiler, comprising:
   a conveyorized cooking surface;
   a lower heat source below the cooking surface;
   an upper heat source above the cooking surface;
   a cooking chamber defined by the cooking surface, the upper heat source, and a broiler housing;
   a venting through passage extending from the cooking chamber to an opening located above the upper heat source;
   an air flow restriction plate positioned above the venting through passage, the air flow restriction plate having a flat surface extending across the opening; and
   a controller configured to control a fuel supply to at least the upper heat source according to a plurality of cooking programs for a food product and to move the cooking surface upon completion of a cooking time, wherein the controller uses a first cooking program for the food product when the air flow restriction plate is positioned above the venting through passage, and the controller uses a second cooking program for the food product when the air flow restriction plate is not positioned above the venting through passage, wherein the first cooking program has a first cooking time for the food product that is shorter than a second cooking time of the second cooking program for the food product.

2. The automatic broiler of claim 1, wherein the air flow restriction plate includes a plurality of openings.

3. The automatic broiler of claim 2, wherein the openings create an open area totaling approximately 30% to 50% of an area of the flat surface.

4. The automatic broiler of claim 3, wherein the openings create an open area totaling approximately 40% of the area of the flat surface.

5. The automatic broiler of claim 2, wherein the openings are approximately ⅛ inch in diameter.

6. The automatic broiler of claim 1, wherein the air flow restriction plate comprises handles along opposite sides.

7. The automatic broiler of claim 6, wherein the air flow restriction plate is rectangular and the handles are formed along a pair of long sides.

8. The automatic broiler of claim 6, wherein the handles are integrally formed with the air flow restriction plate, each handle comprising: a vertical portion extending from the flat surface of the air flow restriction plate and a horizontal portion extending inward from the vertical portion.

9. The automatic broiler of claim 1, further comprising a catalytic exhaust element located above the air flow restriction plate.

10. The automatic broiler of claim 1, further comprising an impedance pan located above the air flow restriction plate.

11. The automatic broiler of claim 1, further comprising a heat spreader located above the air flow restriction plate.

12. The automatic broiler of claim 1, wherein the broiler housing includes a food discharge opening that remains open during operation, the food discharge opening located between the conveyorized cooking surface and the upper heat source.

13. The automatic broiler of claim 12, wherein the air flow restriction plate increases air pressure in the cooking chamber to be greater than air pressure below the lower heat source.

14. The automatic broiler of claim 13, wherein the greater pressure in the cooking chamber prevents air from entering the cooking chamber via the food discharge opening.

15. The automatic broiler of claim 1, wherein the lower heat source and the upper heat source are gas fueled.

16. The automatic broiler of claim 1, wherein the lower heat source and the upper heat source are electric.

* * * * *